US008460748B2

(12) United States Patent
Sinclair et al.

(10) Patent No.: US 8,460,748 B2
(45) Date of Patent: Jun. 11, 2013

(54) PATTERNED MAGNETIC BIT DATA STORAGE MEDIA AND A METHOD FOR MANUFACTURING THE SAME

(75) Inventors: Frank Sinclair, Quincy, MA (US); Vikram Singh, North Andover, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 213 days.

(21) Appl. No.: 12/855,399

(22) Filed: Aug. 12, 2010

(65) Prior Publication Data

US 2011/0111159 A1 May 12, 2011

Related U.S. Application Data

(60) Provisional application No. 61/233,775, filed on Aug. 13, 2009.

(51) Int. Cl.
*B05D 5/12* (2006.01)
(52) U.S. Cl.
USPC .......................................... 427/127; 428/64.2

(58) Field of Classification Search
USPC ........... 427/128, 129, 130, 131, 132; 216/204
See application file for complete search history.

(56) References Cited

U.S. PATENT DOCUMENTS

| | | | |
|---|---|---|---|
| 2004/0191557 A1 | 9/2004 | Kamata et al. | |
| 2006/0286413 A1 | 12/2006 | Liu et al. | |
| 2010/0006537 A1 | 1/2010 | Kamata et al. | |

FOREIGN PATENT DOCUMENTS

| | | | |
|---|---|---|---|
| JP | 2005071578 A | 3/2005 | |
| WO | WO2008/156189 | * 12/2008 | |
| WO | 2009096091 A1 | 8/2009 | |

* cited by examiner

*Primary Examiner* — Michael Cleveland
*Assistant Examiner* — Tabassom Tadayyon Eslami

(57) ABSTRACT

An improved patterned magnetic bit data storage media and a method for manufacturing the same is disclosed. In one particular exemplary embodiment, the improved patterned magnetic bit data storage media may comprise an active region exhibiting substantially ferromagnetism; and an inactive region exhibiting substantially paramagnetism, the inactive region comprising at least two grains and a grain boundary interposed therebetween, wherein each of the at least two grains contain ferromagnetic material, and wherein the at least two grains are antiferromagnetically coupled.

12 Claims, 6 Drawing Sheets

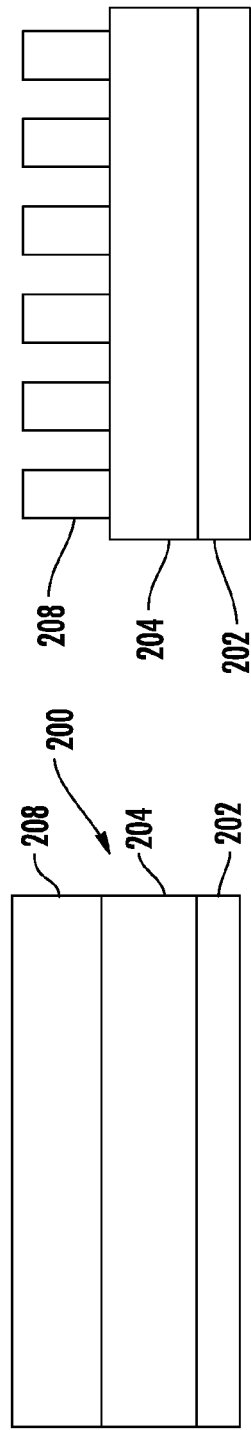
FIG. 3a
FIG. 3b
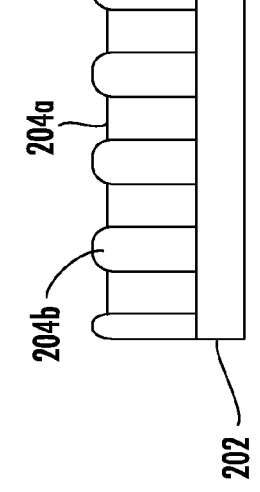
FIG. 3c
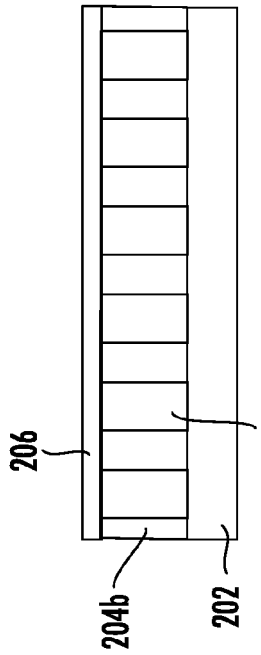
FIG. 3d
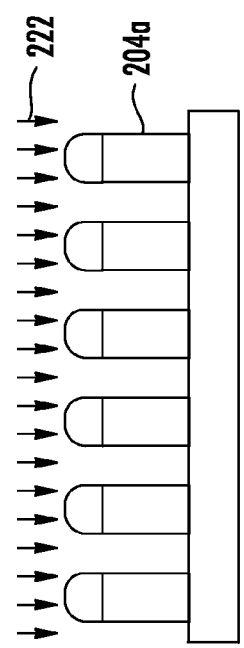
FIG. 3e
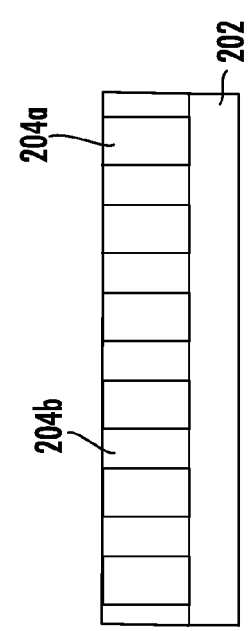
FIG. 3f

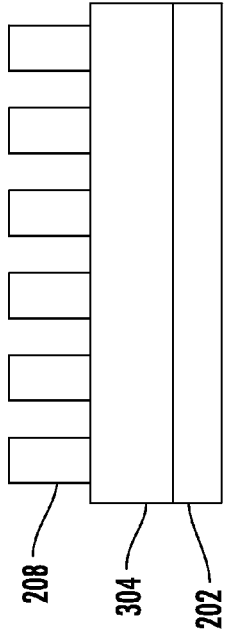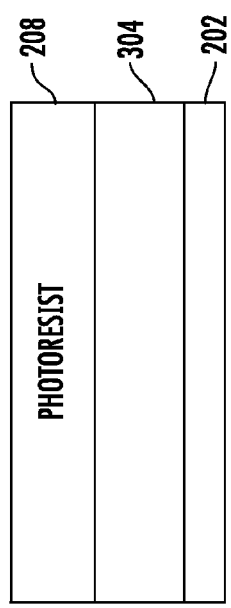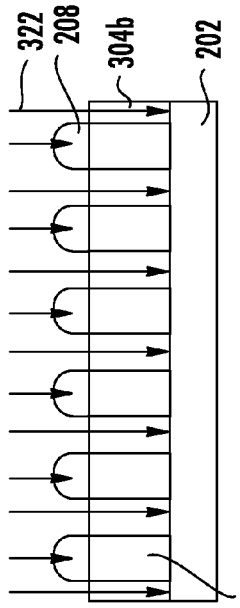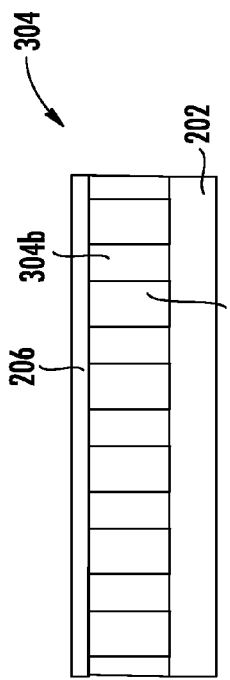

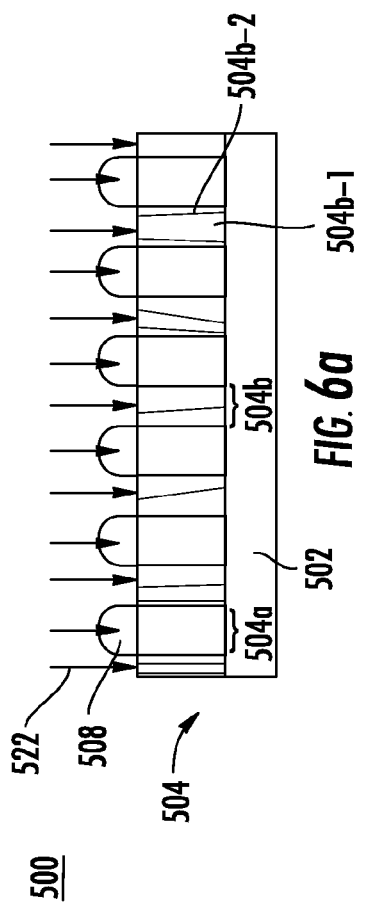
FIG. 6a
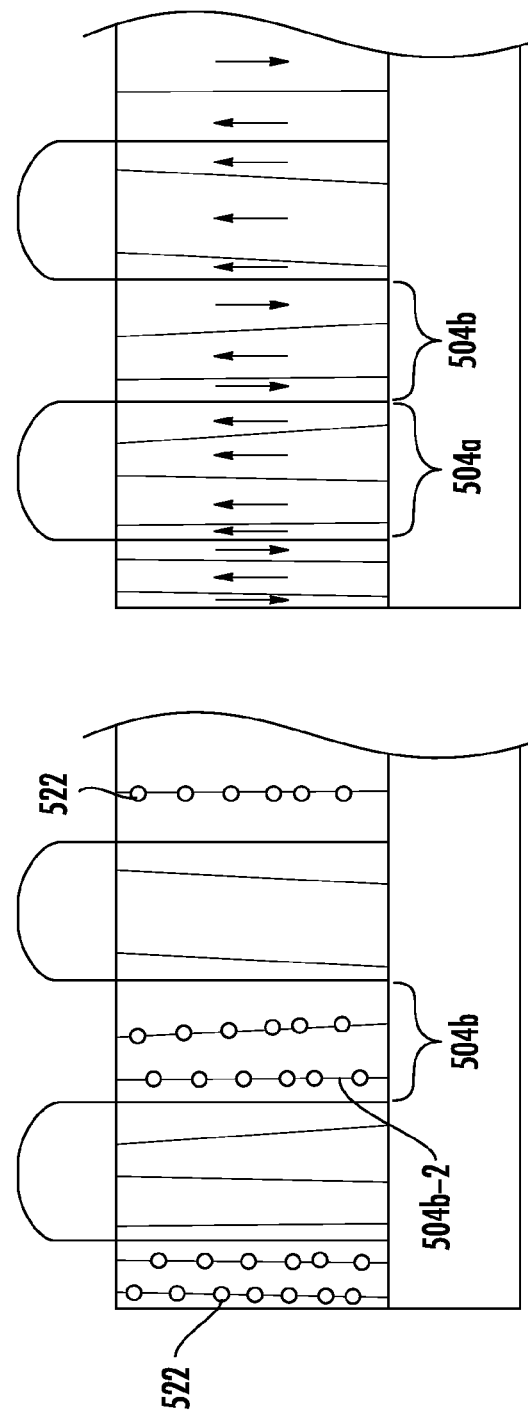
FIG. 6b
FIG. 6c

PATTERNED MAGNETIC BIT DATA STORAGE MEDIA AND A METHOD FOR MANUFACTURING THE SAME

PRIORITY

This application claims priority to U.S. Provisional Patent Application Ser. No. 61/233,775, filed on Aug. 13, 2009, and entitled "A Patterned Magnetic Bit Data Storage Media And A Method For Manufacturing The Same." The entire application of U.S. Provisional Patent Application Ser. No. 61/233,775 is incorporated herein by reference.

FIELD

The present application relates to data storage media, particularly to a patterned magnetic bit data storage media and a method for manufacturing the same.

BACKGROUND

The next generation of magnetic disk data storage media is anticipated to be a patterned magnetic hit data storage media. In current storage media, the magnetic domains used to store data are formed by a recording head. As illustrated in FIG. 1, the conventional data storage media 100, which is in a form of a disk, comprises a base 102, a storage layer 104, and a protective layer 106. As known in the art, the media 100 may be dual sided. But for the purposes of clarity and simplicity, only the upper portion of the media 100 is shown. Within the storage layer 104, there may be a plurality of active regions 104a for storing the data bits and inactive regions 104b isolating each active region 104a.

In the conventional data storage media 100, the active regions 104a may be formed by the recording head 110 as it flies over the media 100. The recording head 110 may also record the data. The recording head 110 may comprise a permeable core 112 and drive coil 114. During the data recording process, the recording head 110 selects active regions 104a where data bits can be recorded. At the same time, the recording head 110 exerts magnetic field to a large number of grains in the active regions 104a to orient the magnetic moments of the grains in particular orientations. By orienting the magnetic moments in particular orientations, the recording head 110 records the data bits. To read the data bits, there may be a reading head (not shown) near the recording head 110 that can detect the external magnetic field due to remanent magnetization of the individual data bits.

In the patterned magnetic bit storage media, the active regions are not formed by the recording head. In addition, the active regions are not formed during the data write process. Instead, the active regions are formed during manufacturing of the media. Referring to FIG. 2, there is shown a conventional patterned magnetic bit storage media 200. The patterned magnetic bit storage media 200 may comprise a base 202. The base 202 may comprise, among others, a support 202a, a magnetically soft underlayer 202b, and a separator 202c. Above the base 202, there may be a data storage layer 204. A protective layer 206 may be disposed above the data storage layer 204.

In the storage layer 204, there may be a plurality of active regions 204a where data bits can be stored. In addition, there may be a plurality of inactive regions 204b isolating the active regions 204a. Each region 204a may store a single data bit represented by the magnetic moment oriented in a particular orientation. The material in each active region 204a may be a ferromagnetic material exhibiting magnetic field. Meanwhile, the material in the inactive regions 204b may be that which have low permeability and remanence exhibiting low external magnetic field. As such, active regions 204a are clearly defined by the external magnetic field.

The data bit may be recorded in each active region 204a by the recording head 210. The recording head 210 may comprise a permeable core 212 and drive coil 214. To record data bits, the recording head 210 exerts magnetic field onto the each active region 204a and orient the magnetic moments 205 in each active region 204a in a particular orientation. To read data, a separate recording head (not shown) may detect the orientation of the magnetic moments 205. The patterned magnetic bit data storage media described above is anticipated to hold much more data, beyond that is achievable by the conventional data storage media 100 shown in FIG. 1.

Referring to FIG. 3a-3f, there are shown a method of manufacturing the conventional patterned magnetic storage media 200. As noted above, the active regions 204a, which can store the data bits, are formed prior to the data recording process. The media 200 may comprise, among others, a base 202 and a data storage layer 204. The material contained in the data storage layer 204 may be a ferromagnetic material.

To form the patterned media 200, a patterning process is performed. In this process, a layer of resist 208 is deposited on the data storage layer 204 (FIG. 3a). Thereafter, the resist layer 208 may be patterned using a known lithographic process to expose portions of the data storage layer 204 (FIG. 3b). Examples of the known lithographic process may include photolithography process, nanoimprint lithography process, and direct write electron beam lithography process.

After performing the patterning process, the data storage layer 204 is etched using, for example, ion milling process. In this process, the exposed portions of the magnetic data storage layer 204 are etched and removed by reactive ions 222 (FIG. 3c). The resulting media 200 may comprise columns 204a of ferromagnetic material spaced apart and isolated from each other by gaps. The columns 204a may ultimately form the active regions 204a. The gaps are then filled with non-magnetic material with low permeability and remanence to form the inactive regions 204b (FIG. 3d). Thereafter, the media 200 is planarized (FIG. 3e), and a protective coating 206 is deposited (FIG. 3f). The resulting structure may comprise active regions 204a isolated by non-magnetic, inactive regions 204b.

Some in data storage industry believe that the above method is inefficient and proposed more efficient methods. One of the proposed method incorporates an ion implantation process. Referring to FIG. 4a-4e, there is shown a method of forming the patterned magnetic bit storage media 200 incorporating the ion implantation process.

In this process, the layer of resist 208 is deposited on the data storage layer 304 (FIG. 4a). The material in the data storage layer 304 may be ferromagnetic material. After depositing the resist layer 208, it is patterned using the known lithographic process, and portions of the data storage layer 304 are exposed (FIG. 4b). After the patterning process, ions 322 are implanted into the exposed regions 304b of the data storage layer 304. Instead of removing the material in the exposed regions 304b, the ions 322 are implanted and remain in the exposed regions 304b. The implanted ions 322 may then convert the material in the implanted regions 304d from ferromagnetic at to a paramagnetic material with low permeability and ideally no remanence (FIG. 4c). Hence, inactive regions 304b may form. Meanwhile, the material in unexposed region 204a may remain ferromagnetic as it is not implanted with the ions 322. As a result, the data storage layer 304 comprising active regions 204a and inactive regions 304b substantially isolating the active regions 204a may form. After forming the active and inactive regions 204a and 304b, the remaining resist layer 208 is removed, and a protective layer 206 is deposited on the storage layer 304 (FIG. 4c).

Various approaches may be taken to form the inactive regions 304b. In one approach, the inactive regions 304b are formed by implanting diluting ions 322 with non-magnetic properties into the ferromagnetic material in the exposed regions 304b. In this approach, the ferromagnetic material in the exposed regions 304b is implanted with diluting ions 322 with sufficient dose such that Curie temperature of the resulting material is reduced to room temperature and no longer magnetic at room temperature. To achieve sufficient dilution, atomic concentration of ~10% or more of the diluting ions 322 may be needed. For a media 200 comprising cobalt (Co) based data storage layer 304 having 30 nm thickness, a 10% concentration implies an ion dose of approximately $3 \times 10^{16}$/cm$^2$. This dose may be proportional to the thickness of the storage layer 204 and thus may be less if the data storage layer 204 is thinner.

In another approach, the magnetic material may be converted by affecting the crystallinity or microstructure of the material in the exposed regions 304b. As known in the art, ion implantation process is an energetic process that can cause many atomic collisions. During implantation, the material in the exposed regions 304b, otherwise crystalline and exhibit external magnetic field, may become amorphous and/or disordered. As a result, the material exhibit low ferromagnetism. Meanwhile, the unexposed portion 204a next to the exposed portion 204b may retain its original magnetic properties.

Typical ion dose necessary to amorphize/disorder a silicon substrate is $1 \times 10^{15}$ ions/cm$^2$ or higher. In a metal substrate, this required dose may be even higher, particularly if the implant is performed at a room temperature or higher. This method is particularly effective if the original ferromagnetic layer is a multilayer that derives its magnetic properties from the interaction of very thin layers in a stack.

The above proposed methods, although useful, have several drawbacks. For example, the methods may have low throughput. Each method noted above requires ion dose ranging about $1 \times 10^{16}$-$1 \times 10^{17}$ ions/cm$^2$. However, the beam current in a conventional ion implanter is limited due system limitations in generating ions or in cooling the substrate. Accordingly, such a high dose will limit the throughput and increase the manufacturing costs. In addition, the resist used in the process may not survive ion implantation in such a high dose.

In some cases, electron beam is used to directly write or pattern the resist 208. The direct write process may enable much greater resolution. Because this process is a bit by bit process, it is not suitable for high throughput production. The nano-imprint lithographic process, an alternative to the direct e-beam patterning process, however, limits the maximum practical step height of the resist to about 50 nm. Sputtering caused by the ion beam can significantly reduce the thickness of the resist and will limit its ability to shield the layers underneath.

In addition to the resist, the material in the data storage layer may be sputtered. The sputtering may be problematic as the ion dose required is high. The resulting storage layer may be non-planar, having steps with different height. Such a non-planarity may be undesirable as read/write head may be damaged by a rough, non-planar surface. These sputtering effects, whether of the resist or the data storage layer, proceed in proportion to the total dose needed for the process.

Accordingly, a new method is needed.

SUMMARY OF THE DISCLOSURE

An improved patterned magnetic bit data storage media and a method for manufacturing the same is disclosed. In one particular exemplary embodiment, the improved patterned magnetic bit data storage media may comprise an active region exhibiting substantially ferromagnetism; and an inactive region exhibiting substantially paramagnetism, the inactive region comprising at least two grains and a grain boundary interposed therebetween, wherein each of the at least two grains contain ferromagnetic material, and wherein the at least two grains are antiferromagnetically coupled.

In accordance with other aspects of this particular exemplary embodiment, the antiferromangetic coupling between the at least two grains may be produced by a material disposed along the grain boundary.

In accordance with additional aspects of this particular exemplary embodiment, the material disposed along the grain boundary may contain oxygen.

In accordance with further aspects of this particular exemplary embodiment, the material disposed along the grain boundary may comprise an oxide of the ferromagnetic material contain in at least one of the at least two grains.

In accordance with other aspects of this particular exemplary embodiment, the material disposed along the grain boundary may contain at least one of C, Si, Ge, Sn, Pb, O, S, Se, Te, and Po.

In accordance with additional aspects of this particular exemplary embodiment, magnetic moments of the at least two grains in the inactive regions may be in non-parallel orientation.

In accordance with further aspects of this particular exemplary embodiment, magnetic moments of the at least two grains in the inactive regions may be in substantially anti-parallel orientation.

In accordance with another exemplary embodiment, a technique for manufacturing a magnetic media comprising an active region and an inactive region is disclosed. The method may comprise: introducing non-ferromagnetic material along a grain boundary of the inactive region, the grain boundary being interposed between at least two adjacent grains of the inactive region, each of the at least two adjacent grains containing ferromagnetic material; and reacting the non-ferromagnetic material disposed along the grain boundary with ferromagnetic material contained in at least one of the at least two adjacent grains.

In accordance with additional aspects of this particular exemplary embodiment, the technique may further comprise: orienting magnetic moments of the at least two adjacent grains in non-parallel orientation.

In accordance with further aspects of this particular exemplary embodiment, the technique may further comprise: orienting magnetic moments of the at least two adjacent grains in anti-parallel orientation.

In accordance with other aspects of this particular exemplary embodiment, the at least two adjacent grains in the inactive region may be antiferromagnetically coupled.

In accordance with additional aspects of this particular exemplary embodiment, the introducing non-ferromagnetic material may comprise implanting ions containing oxygen near the grain boundary.

In accordance with further aspects of this particular exemplary embodiment, the technique may further comprise: disposing a mask upstream of the magnetic media, the mask comprising at least one aperture exposing the inactive region.

In accordance with other aspects of this particular exemplary embodiment, the technique may further comprise: thermally treating the inactive region to distribute oxygen substantially uniformly along the grain boundary.

In accordance with additional aspects of this particular exemplary embodiment, the introducing non-ferromagnetic material may comprise introducing non-ferromagnetic material using a diffusion process.

In accordance with another exemplary embodiment, another technique for manufacturing a magnetic media comprising an active region and an inactive region is disclosed. The technique may comprise: introducing non-ferromagnetic material along a grain boundary of the inactive region, the grain boundary interposed between at least two adjacent grains of the inactive region, the at least two adjacent grains comprising ferromagnetic material; and antiferromagnetically coupling the at least two adjacent grains so as to orient magnetic moments of the at least two grains in non-parallel orientation.

In accordance with additional aspects of this particular exemplary embodiment, the magnetic moments of the at least two grains may be in substantially anti-parallel orientation.

In accordance with further aspects of this particular exemplary embodiment, the introducing non-ferromagnetic material may comprise implanting ions containing oxygen along the grain boundary.

In accordance with other aspects of this particular exemplary embodiment, the introducing non-ferromagnetic material may comprise introducing species containing at least one of C, Si, Ge, Sn, Pb, O, S, Se, Te, and Po along the grain boundary.

In accordance with other aspects of this particular exemplary embodiment, the technique may further comprise: disposing a mask upstream of the magnetic media, the mask comprising at least one aperture exposing the inactive region.

BRIEF DESCRIPTION OF THE DRAWINGS

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art will recognize additional implementations, modifications, and embodiments, as well as other fields of use, which are within the scope of the present disclosure as described herein, and with respect to which the present disclosure may be of significant utility.

FIG. 3a-3f illustrate a conventional method for manufacturing the patterned magnetic storage media 200 shown in FIG. 2.

FIG. 4a-4e illustrate another conventional method for the patterned magnetic storage media 200 shown in FIG. 2.

FIG. 6a-6c illustrate a method for manufacturing the patterned magnetic storage media 500 according to another embodiment of the present disclosure.

DETAILED DESCRIPTION

To solve the deficiencies associated with the methods noted above, a novel method of manufacturing patterned magnetic bit media is introduced. For purpose of clarity, the method focuses on adding particles to a patterned magnetic bit media that comprises a storage layer. Herein, the particles may be charged or neutral, sub-atomic, atomic, or molecular particles. Meanwhile, the patterned magnetic bit media may comprise one or more storage layers that are capable of exhibiting external magnetism. To add the particles, an ion implantation system may be used. However, those of ordinary skill in the art will recognize other systems capable of adding particle or material to the substrate may also be used. For example, a doping system including, but not limited to, a plasma assisted doping (PLAD) or plasma immersion ion implantation (PIII) system, or other types of doping system may also be used. Other types of processing systems capable of adding material or particles may also be used. Examples of such systems may include a furnace, chemical vapor deposition (CVD) system, plasma enhanced chemical vapor deposition (PECVD) system, atomic layer deposition (ALD) system, molecular beam epitaxy (MBE) system etc. . . . .

Patterned Magnetic Bit Data Storage Media

Figure 1:
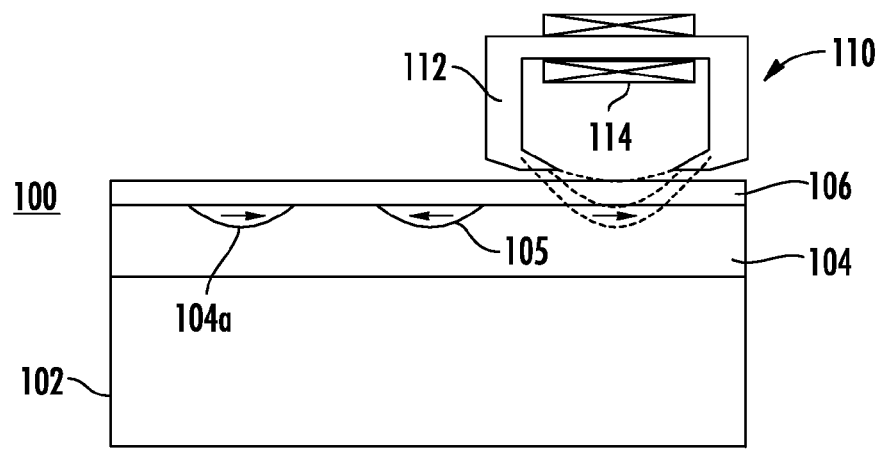
FIG. 1 illustrates conventional data storage media 100.
Figure 2:
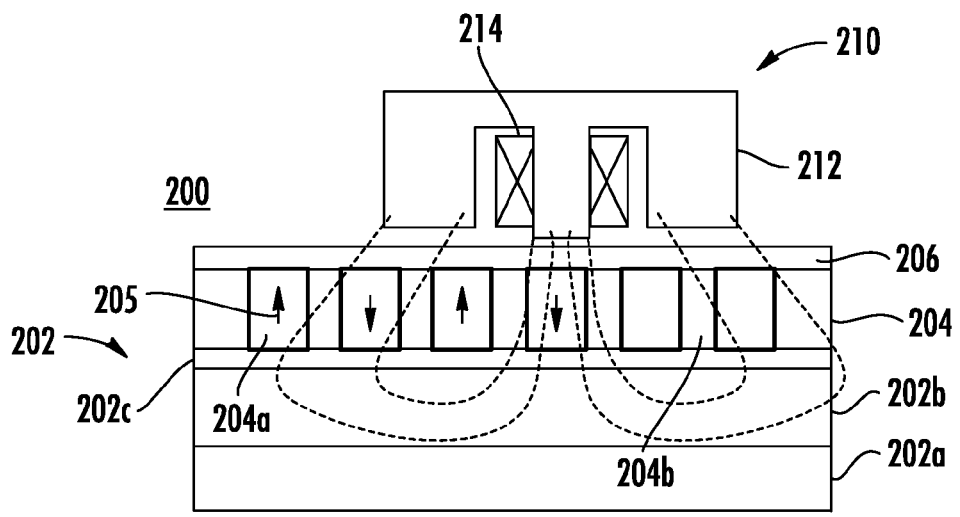
FIG. 2 illustrates conventional patterned magnetic bit storage media 200.
Figure 5A:
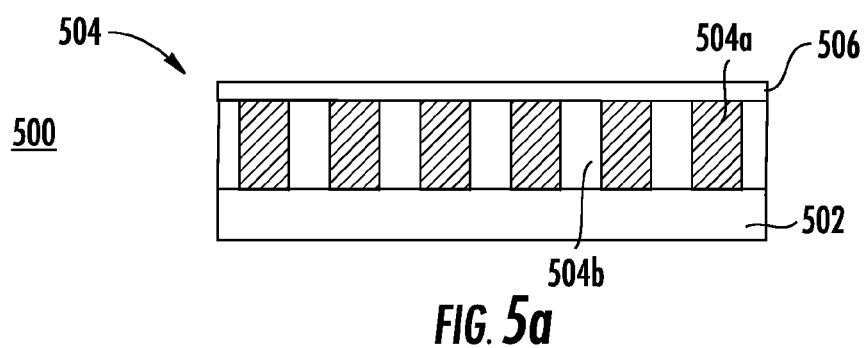
FIG. 5a-5d illustrate a patterned magnetic storage media 500 according to one embodiment of the present disclosure.

Referring to FIG. 5a, there is shown a patterned magnetic data storage media 500 according to one embodiment of the present disclosure. The media 500 may be in a form of a disk. In addition, the media 500 may be dual sided. For the purpose of clarity and simplicity, only a portion of the media 500 is illustrated.

On at least one side of the media 500, there may be a base 502, a data storage layer 504, and a protective coating 506. The data storage layer 504 may comprise a plurality of active regions 504a where data bits may be stored. In addition, the data storage layer 504 may comprise a plurality of inactive regions 504b where data bits are not stored. As illustrated in the figure, the inactive regions 504b may substantially isolate each active region 504a. The material in each active region 504a may be ferromagnetic material exhibiting ferromagnetism.

Figure 5B:
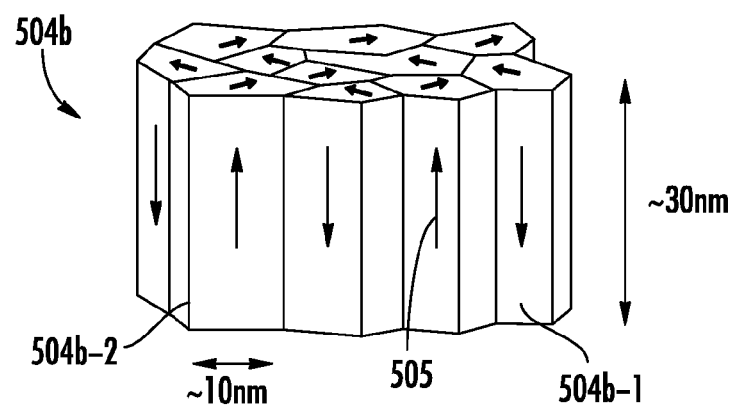

Referring to FIG. 5b, there is shown a detailed illustration of the inactive regions 504b. In the present embodiment, the inactive regions 504b of the present embodiment may comprise at least two vertically extending grains 504b-1 separated by a grain boundary 504b-2. Although horizontally extending grains or vertically and horizontally extending grains are not precluded, the present embodiment prefers vertically extending grains 504b-1.

In the present embodiment, the material in each grains 504b-1 may also be ferromagnetic material. As such, the magnetic moment 505 in each grain 504b-1 is oriented along one direction, and each grain 504b-1, alone, may exhibit ferromagnetism. Examples of the material in the grains 504b-1 may include Co or nickel (Ni), or alloy containing Co and/or Ni. Although Co, Ni, or alloy containing thereof is preferred, other material exhibiting ferromagnetism is not precluded. Cobalt, Nickel, or alloy containing thereof is preferred as the electron orbitals of individual atoms in such a material may overlap. The combined electron states may have a minimum quantized energy states when the unpaired electron spin in neighboring atoms are parallel. This produces a tendency for all the atoms to line up their magnetic moments in the same direction. The material will typically arrange itself into domains, whose boundaries can be coincident with crystal grain boundaries or can cross through a perfect crystal grain. Within a domain, all the magnetic moments are aligned. In the presence of a magnetizing field, these domain magnetization directions are all aligned, and the ferromagnetic material will develop an external magnetic field that can be detected by the read head.

Although the material in each grain 504b-1 is ferromagnetic material and each grain 504b-1, alone, exhibits ferromagnetism, the grains 504b-1, collectively, exhibit low level of ferromagnetism or exhibit substantially paramagnetic behavior. This may be attributable to antiferromagnetic coupling of the grains 504b-1 proximate to one another. In one embodiment, adjacent grains 504b-1 are antiferromagnetically coupled, and their magnetic moments are oriented in non-parallel orientation or even anti-parallel orientation. As a result, their magnetic moments 505 may cancel one another, and the grains 504b-1 in the inactive regions 504b, as a whole, may exhibit reduced ferromagnetic level or even substantially paramagnetic behavior.

Figure 5C:
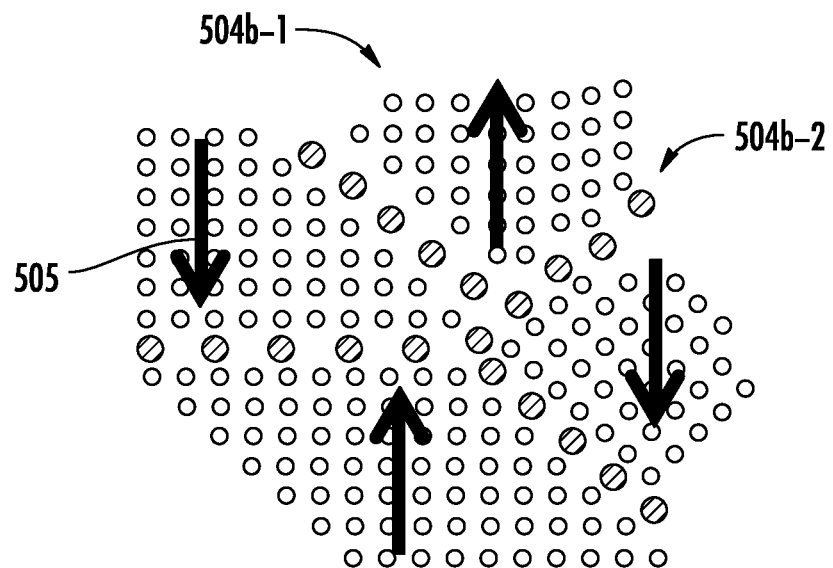

Referring to FIG. 5c, there is shown a detailed plan view of several grains 504b-1 in the inactive regions 504b. As shown in the figure, the grains 504b-1 are separated from one another, by grain boundaries 504b-2. Along the grain boundaries 504b-2, non-ferromagnetic material may preferably be disposed. The material may be one or more paramagnetic, antiferromagnetic and ferrimagnetic materials. However, O, oxide of the ferromagnetic material in the grains 504b-1, or other species containing O, is preferred in the present embodiment. In other embodiments, other materials are disposed. Several examples of the other material may include species containing Group III-VII elements. Specific examples of the other materials may include species containing carbon (C), silicon (Si), germanium (Ge), tin (Sn), lead, (Pb), sulfur (S), selenium (Se), tellurium (Te), and polonium (Po).

Figure 5D:
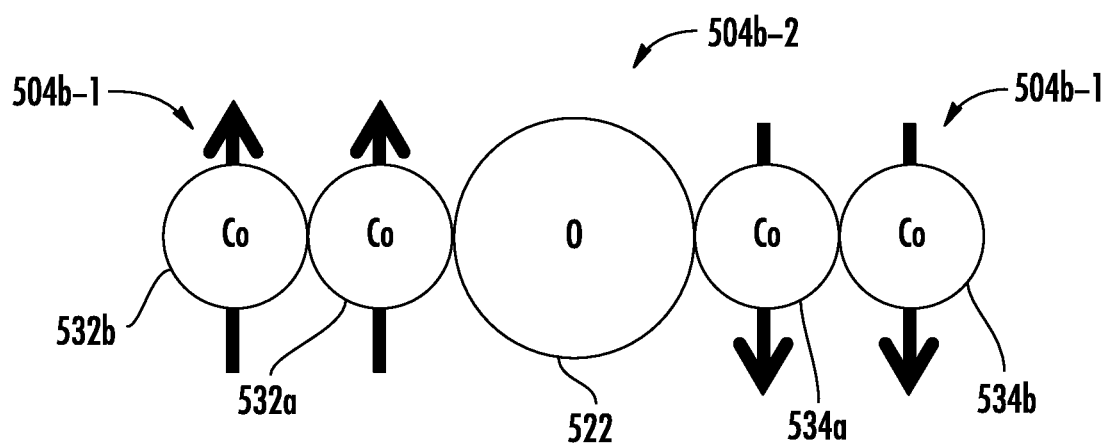

Referring to FIG. 5d, there is shown a structural diagram of the materials proximate to the grain boundary 504b-2, and their magnetic moments. As noted above, the material along the grain boundary 504b-2 may include O, oxide compound of the material in the grain 504b-1, or other species containing O. If the material in the grains 504b-1 is Co, examples of the material disposed along the grain boundary 504b-2 may include cobalt monoxide (CoO), cobalt sesquioxide ($Co_2O_3$), tricobalt tetroxide ($Co_3O_4$), or any other variations of the cobalt oxide. For the purposes of simplicity, only one oxygen atom and two cobalt atoms are illustrated.

As illustrated in the figure, O atoms 522 may be disposed along the grain boundary 504b-2. On both sides of O atom 522, there may be first to fourth Co atoms 532a, 532b, 534a, and 534b. The first and second Co atoms 532a and 532b may be disposed on the first side of O atom 522, whereas the third and fourth Co atoms 534a and 534b may be disposed on the second, opposite side of O atom 522. At least the second and fourth Co atoms 532b and 534b may be disposed within the adjacent grains 504b-1.

As illustrated in the figure, the first and third Co atoms 532a and 534a may be proximate to O atom 522. Meanwhile, the second and fourth Co atoms 532b and 534b may be proximate to the first and third Co atoms 532a and 534a, respectively. When bonded, the bond between O atom 522 and the first and third Co atoms 532a and 534a may cause interactions between the energy states of the unpaired spins in the first and third Co atoms 532a and 534a. However, instead of inducing parallel alignment of the magnetic moment of the neighboring first and third Co atoms 532a and 534a, the bond may produce non-parallel, for example, an anti-parallel, magnetic moments. As such, antiferromagnetic coupling might occur between the first and third Co atoms 532a and 534a, and the first and third Co atoms 532a and 534a may have non-parallel or even anti-parallel magnetic moments. Their magnetic moments may cancel each other, and the oxide compound, as whole, may show reduced ferromagnetic level or even substantially paramagnetic behavior.

Meanwhile, the second and fourth Co atoms 532b and 534b may line up their magnetic moments in the same direction as the adjacent, the first and third Co atoms 532a and 534a, respectively. Such an alignment may be due to overlap of electron orbitals of the adjacent Co atoms 532a, 532b, 534a and 534b. As such, the magnetic moments of the first and second Co atoms 532a and 532b may be oriented in a parallel orientation. Meanwhile, the magnetic moments of the third and fourth Co atoms 534a and 534b may be oriented in parallel orientation. However, the magnetic moments of the first and second Co atoms 532a and 532b may be non-parallel, or even anti-parallel, to the magnetic moments of the third and fourth Co atoms 534a and 534b. Accordingly, the first and second Co atoms 532a and 532b may be antiferromagnetically coupled to the third and fourth Co atoms 534a and 534b. Moreover, the adjacent grains 504b-1 containing at least the second and fourth Co atoms 532b and 534b may be antiferromagnetically coupled to each other. The adjacent grains 504b-1, as a whole, may exhibit reduced ferromagnetic level or even substantially paramagnetic behavior.

Method for Manufacturing Patterned Magnetic Media

Referring to FIG. 6a-6c, there is shown one exemplary method for manufacturing a patterned magnetic media 500 according to one embodiment of the present disclosure. In the present embodiment, the method includes introducing non-ferromagnetic material into the inactive regions 504b of the data storage layer 504. As illustrated in the figure, the data storage layer 504 may also contain active regions 504a. The non-ferromagnetic material, in the present embodiment, may be O or species containing O. However, other material may also be introduced. Specific examples of the other materials may include species containing C, Si, Ge, Sn, Pb, S, Se, Te, and Po.

Oxygen or oxygen containing species may be introduced into the inactive regions 504b of the media 500 in a form of particles 522, charged or neutral. In the present embodiment, an ion implantation process may be used, and charged ions 522 containing O may be introduced. However, other processes are not precluded in the present disclosure. Examples of other processes may include diffusion process. In the diffusion process, a film, paste, or gas containing O may be disposed above the inactive regions 504b. Thereafter, O or O containing species may be diffused into the inactive regions 504b. To aid the diffusion process, heat or energy (e.g. laser) may be applied.

To selectively introduce the particles 522 into the inactive regions 504b, but not the active regions 504a, one or more masks 508 may be used. In the present embodiment, the mask 508 may contain one or more apertures exposing the inactive regions 504b. The mask may be in a form of hard mask, a shadow mask, or a resist mask, or a combination thereof. The mask may be disposed upstream of the media 500, and the particles 522 may be introduced into the media 500 via the apertures. If the resist mask is used, a layer of resist 508 may be deposited onto the media 500. Thereafter, the resist 508 may be patterned using electron beam direct write process or any other known lithographic processes to expose selected portions of the storage layer 504. If a hard mask is used in conjunction with the resist mask 508, a layer of hard mask (not shown) may be deposited on the media 500. Thereafter, the resist 508 may be deposited on the hard mask layer. The resist 508 may be patterned, and the hard mask may be patterned according to the pattern of the resist 508.

The particles 522, when introduced, may preferably be distributed uniformly along the grain boundaries 504b-2 (FIG. 5b). For example, a monolayer of O atoms 522 may preferably be disposed along the grain boundaries 504b-2. To achieve uniform distribution, the disk 500 may optionally undergo a post treatment process such as, for example, post thermal treatment. The optional post treatment may also be desirable if the material in the inactive regions 504b comprises a single crystal material and if the post treatment is capable of converting the material into polycrystalline material.

After uniformly distributing the particles 522 along the grain boundaries 504b-2, the particles 522 may react with the material in the grains 504b-1. In the present embodiment, O or species containing O may react with Co atoms near the grain boundary 504b-2. If desired, the reaction between Co atoms and the particles 520 may be enhanced by the post treatment noted above. As the particles 522 react with Co atoms, antiferromagnetic coupling between adjacent grains 504b-1 may occur (FIG. 6c). As a result, the magnetic moments in adjacent grains 504b-1 may be oriented in non-parallel, or even substantially anti-parallel mariner. Their magnetic moments may cancel one another, and the inactive region 504b exhibiting reduced ferromagnetic level or even substantially paramagnetic behavior may form. The material in the active region 504a, meanwhile, may retain its initial ferromagnetism as the particles 522 are not introduced into the region 504a. In the process, isolated ferromagnetic active regions 504a may form on the magnetic media 500.

Any residue, such as resist, remaining on the storage media 500 may be removed via, for example, etching or resist stripping process. A protective coating 506 may be deposited on the storage layer 504. In the present disclosure, the protective coating 506 may be deposited before or after introducing the particles 522.

Process Parameter

In the present disclosure, various species of particles 522 may be introduced to the inactive regions 504b of the magnetic media 500. As noted above, the various species may include species containing C, Si, Ge, Sn, Pb, O, S, Se, Te, and Po. Oxygen, however, may be preferred in the present embodiment as oxygen is nominally soluble in many ferromagnetic materials, including cobalt based alloys (e.g. ~0.02 atomic % at 600° C.), Oxygen, when introduced, may quickly and uniformly be distributed along the grain boundaries 504b-2 in the inactive regions 504b before reacting with the ferromagnetic material in the grains 504b-1. To enhance uniform distribution of oxygen and discourage reaction with the ferromagnetic material within the grains 504b-1, it may be preferable to separate the oxygen introduction stage and the reaction stage. Such separation may be achieved by, for example, maintaining the temperature of the storage layer 504 below that which the oxygen 522 may react with the ferromagnetic material during oxygen introduction stage, and maintaining the temperature of the magnetic layer 504 above the reaction temperature after the oxygen particles 522 are uniformly distributed along the grain boundaries.

Although O is preferred, other types of particles may also be used. If the other types of particles are capable of being distributed uniformly along the grain boundaries 504b-2 and capable antiferromagnetically coupling the adjacent grains 504b-1, use of the other material is not precluded in the present disclosure. As noted above, the other types of particles may include species containing C, Si, Ge, Sn, Pb, S, Se, Te, and Po.

If an ion implantation system is used to introduce the particles 522, the dose of the particles or ions may be maintained at a range of approximately $1\times10^{10}$-$5\times10^{15}$ ions/cm$^2$. However, a dose in other range may also be used. For example, if the size of the grains in the inactive regions 504b is ~10 nm in diameter, an oxygen concentration between ~0.1% and 2% may be sufficient to dispose a monolayer of oxygen in the grain boundaries. Such a concentration may correspond to an ion dose ranging about $1\times10^{14}$ to about $3\times10^{15}$/cm$^2$, depending on the area concentration of O needed at the grain boundaries.

A novel magnetic media and a method for manufacturing the same is disclosed. Compared to the conventional magnetic media or the conventional method, the present disclosure provides additional advantages. Although the present disclosure has been described herein in the context of particular embodiments having particular implementation in a particular environment for a particular purpose, those of ordinary skill in the art will recognize that its usefulness is not limited thereto and that the present disclosure may be beneficially implemented in any number of environments for any number of purposes. Various changes in form and detail may be made without departing from the spirit and scope of the invention as defined herein.

What is claimed is:

1. A method of forming a magnetic media comprising an active region and an inactive region, the method comprising:
   introducing non-ferromagnetic material along a grain boundary of the inactive region, the grain boundary being interposed between at least two adjacent grains of the inactive region, each of the at least two adjacent grains containing ferromagnetic material; and
   reacting the non-ferromagnetic material disposed along the grain boundary with ferromagnetic material contained in at least one of the at least two adjacent grains, wherein the at least two adjacent grains in the inactive region are antiferromagnetically coupled.

2. The method according to claim 1, further comprising:
   orienting magnetic moments of the at least two adjacent grains in non-parallel orientation.

3. The method according to claim 1, further comprising:
   orienting magnetic moments of the at least two adjacent grains in anti-parallel orientation.

4. The method according to claim 1, wherein the introducing non ferromagnetic material comprises implanting ions containing oxygen near the grain boundary.

5. The method according to claim 4, further comprising:
   disposing a mask on the magnetic media, the mask comprising at least one aperture exposing the inactive region.

6. The method according to claim 5, further comprising:
   thermally treating the inactive region to distribute oxygen substantially uniformly along the grain boundary.

7. The method according to claim 1, wherein the introducing non-ferromagnetic material comprises introducing non-ferromagnetic material using a diffusion process.

8. A method of forming a magnetic media comprising an active region and an inactive region, the method comprising:
   introducing non-ferromagnetic material along a grain boundary of the inactive region, the grain boundary interposed between at least two adjacent grains of the inactive region, the at least two adjacent grains comprising ferromagnetic material; and
   antiferromagnetically coupling the at least two adjacent grains so as to orient magnetic moments of the at least two grains in non-parallel orientation.

9. The method according to claim 8, wherein the magnetic moments of the at least two grains are in substantially anti-parallel orientation.

10. The method according to claim 8, wherein the introducing non ferromagnetic material comprises implanting ions containing oxygen along the grain boundary.

11. The method according to claim 8, wherein the introducing non ferromagnetic material comprises introducing species containing at least one of C, Si, Ge, Sn, Pb, O, S, Sc, Te, and Po along the grain boundary.

12. The method according to claim 8, further comprising:
    disposing a mask upstream of the magnetic media, the mask comprising at least one aperture exposing the inactive region.

* * * * *